United States Patent
Gallet et al.

(10) Patent No.: US 9,217,391 B2
(45) Date of Patent: Dec. 22, 2015

(54) TURBINE ENGINE COMPRISING A CONTRAROTATING PROPELLER RECEIVER SUPPORTED BY A STRUCTURAL CASING ATTACHED TO THE INTERMEDIATE HOUSING

(71) Applicant: SNECMA, Paris (FR)

(72) Inventors: Francois Gallet, Paris (FR); Audrey Grede, Crisenoy (FR)

(73) Assignee: SNECMA, Paris (FR)

( * ) Notice: Subject to any disclaimer, the term of this patent is extended or adjusted under 35 U.S.C. 154(b) by 253 days.

(21) Appl. No.: 13/654,796

(22) Filed: Oct. 18, 2012

(65) Prior Publication Data

US 2013/0098066 A1   Apr. 25, 2013

(30) Foreign Application Priority Data

Oct. 21, 2011 (FR) ...................................... 11 59581

(51) Int. Cl.
*F02K 3/062* (2006.01)
*F02K 3/072* (2006.01)

(52) U.S. Cl.
CPC ................. *F02K 3/072* (2013.01); *F02K 3/062* (2013.01); *F05D 2220/324* (2013.01); *F05D 2220/325* (2013.01); *Y02T 50/672* (2013.01)

(58) Field of Classification Search
CPC ......... F02K 3/072; F02K 3/062; F02C 3/067; F02C 7/20; F05D 2220/324; F05D 2220/325
USPC .............................................. 60/268, 39.162
See application file for complete search history.

(56) References Cited

U.S. PATENT DOCUMENTS

| | | | |
|---|---|---|---|
| 4,683,717 A * | 8/1987 | Naud | 60/226.1 |
| 4,854,525 A | 8/1989 | Chee | |
| 4,951,461 A * | 8/1990 | Butler | 60/39.162 |
| 4,976,102 A * | 12/1990 | Taylor | 60/226.1 |
| 5,079,916 A | 1/1992 | Johnson | |
| 5,443,229 A * | 8/1995 | O'Brien et al. | 244/54 |
| 8,225,593 B2 * | 7/2012 | Le Hong et al. | 60/268 |

(Continued)

FOREIGN PATENT DOCUMENTS

| | | |
|---|---|---|
| FR | 2 605 679 A1 | 4/1988 |
| FR | 2 942 203 A1 | 8/2010 |

(Continued)

OTHER PUBLICATIONS

French Preliminary Search Report issued Jun. 11, 2012, in French Patent Application No. FR1159581 with English translation.

*Primary Examiner* — Phutthiwat Wongwian
*Assistant Examiner* — Jason H Duger
(74) *Attorney, Agent, or Firm* — Oblon, McClelland, Maier & Neustadt, L.L.P.

(57) ABSTRACT

An open rotor type aircraft turbine engine including a contrarotating propeller receiver and a dual-body gas generator having a low-pressure compressor and a high-pressure compressor separated by an intermediate housing, in which the gas generator is arranged upstream from the receiver is provided. The turbine engine includes a structural casing for supporting the receiver, surrounding the gas generator and having a downstream end attached to the receiver and an upstream end attached to the intermediate housing; and a connection device between the structural supporting casing and the gas generator, arranged between the upstream and downstream ends of the casing.

5 Claims, 3 Drawing Sheets

(56) References Cited

U.S. PATENT DOCUMENTS

| | | | |
|---|---|---|---|
| 8,371,105 B2 * | 2/2013 | Glynn et al. | 60/268 |
| 8,701,380 B2 * | 4/2014 | Vuillemin | 60/39.162 |
| 8,834,119 B2 * | 9/2014 | Balk et al. | 416/160 |
| 2011/0154831 A1 * | 6/2011 | Journade et al. | 60/797 |
| 2011/0197595 A1 * | 8/2011 | Journade et al. | 60/797 |
| 2011/0243735 A1 * | 10/2011 | Balk et al. | 416/129 |
| 2011/0311361 A1 * | 12/2011 | Charier et al. | 416/129 |
| 2012/0177493 A1 * | 7/2012 | Fabre | 416/129 |
| 2012/0207594 A1 * | 8/2012 | Chanez et al. | 415/208.1 |
| 2013/0195640 A1 * | 8/2013 | Grede et al. | 415/208.1 |

FOREIGN PATENT DOCUMENTS

| | | |
|---|---|---|
| FR | 2 944 155 A1 | 10/2010 |
| FR | 2 951 504 A1 | 4/2011 |
| GB | 2377973 A * | 1/2003 |
| WO | WO 2010092094 A1 * | 8/2010 |

* cited by examiner

TURBINE ENGINE COMPRISING A CONTRAROTATING PROPELLER RECEIVER SUPPORTED BY A STRUCTURAL CASING ATTACHED TO THE INTERMEDIATE HOUSING

FIELD OF THE INVENTION

The present invention relates to the field of aircraft turbine engines comprising a contrarotating propeller receiver arranged downstream from a gas generator.

The invention particularly applies to a turbine engine having non-streamlined propellers, referred to as an open rotor turbine engine, wherein a free power turbine drives the two contrarotating propellers, directly or indirectly via a mechanical transmission device acting as a reduction gear.

STATE OF THE RELATED ART

FIG. 1 shows an open rotor type aircraft turbine engine 1, according to a known embodiment of the prior art, comparable to that described in the document FR 2 944 155.

In this figure, direction A consists of the longitudinal direction or axial direction, parallel to the longitudinal axis 2 of the turbine engine. Direction B consists of the radial direction of the turbine engine, and direction C of the tangential direction. Furthermore, the arrow 4 represents the direction of progression of the aircraft under the action of the thrust of the turbine engine 1, this direction of progression going against the main gas flow direction 4' within the turbine engine. The terms "upstream" and "downstream" used hereinafter are to be interpreted with respect to the main gas flow direction 4'.

At the front, the turbine engine has an air inlet 6 extending to the rear by means of a pod 8, globally comprising an outer shell 10 and an inner shell 12, both centred on the axis 2 and radially offset with respect to each other.

The inner shell 12 forms an external radial housing for a gas generator 14, conventionally comprising, upstream to downstream, a low-pressure compressor 16, a high-pressure compressor 18, a compression chamber 20, a high-pressure turbine 22, and an intermediate-pressure turbine 24. The compressor 16 and the turbine 24 are mechanical connected by a shaft 26, thus forming a low-pressure body, whereas the compressor 18 and the turbine 22 are mechanically connected by a shaft 28, forming a higher pressure body. Consequently, the gas generator 14 has a conventional, dual-body, design, wherein the compressors 16 and 18 are separated by an intermediate housing 27, acting as an important structural component of the turbine engine. Indeed, this housing 27, traversed by the outflowing air from the compressor 16 before it enters the compressor 18, has an upper end equipped with an engine mount 29 connecting the turbine engine 1 to a coupling strut 31, preferably intended to be mounted on the aircraft wing unit.

Downstream from the intermediate-pressure turbine 24, a contrarotating propeller receiver 30 is situated, the receiver acting as the propulsion component of the turbine engine.

The receiver 30 comprises at the upstream end thereof a free power turbine 32, acting as a low-pressure turbine. This turbine comprises a rotor 34 mechanically connected to a mechanical transmission device 13, acting as a reduction gear and particularly comprising a planetary gear 15. The stator part thereof comprises an outer housing 36 wherein one upstream flange 38 is attached to a downstream flange 40 of the casing 12, situated at the end of the intermediate turbine 24. The attachment is performed conventionally, by bolting.

Furthermore, downstream from the turbine 32, the receiver 30 incorporates a first propeller 7 or downstream propeller, bearing blades 7a. Similarly, the system 30 comprises a second propeller 9 or upstream propeller, bearing blades 9a. In this way, the propellers 7, 9 are offset with respect to each other along the direction 4, and both situated downstream from the free turbine 32.

The two propellers 7, 9 are intended to rotate in opposite directions about the axis 2 whereon they are centred, the rotations being performed with respect to the stator which remains immobile. The rotation of these two propellers 7, 9, devoid of outer radial streamlining surrounding same, is performed using the mechanical transmission device 13 to which they are connected.

The receiver 30 is thus arranged overhanging the downstream end of the gas generator, which gives rise to stress causing distortions thereof, particularly of the outer housing thereof. This may give rise to significant play-related consumptions at the end of gas generator module blades, particularly on the high-pressure compressor blades. These play-related consumptions are liable to degrade the overall efficiency and surge margin of the turbine engine.

DESCRIPTION OF THE INVENTION

The aim of the invention is thus that of remedying, at least partially, the drawbacks mentioned above, in relation to embodiments of the prior art.

To this end, the invention relates to an aircraft turbine engine comprising a contrarotating propeller receiver and a dual-body gas generator comprising a low-pressure compressor and a high-pressure compressor separated by an intermediate housing, said gas generator being arranged upstream from said receiver.

According to the invention, the turbine engine further comprises a structural casing for supporting the receiver, said casing surrounding the gas generator and having a downstream end attached to said receiver and an upstream end attached to said intermediate housing. Furthermore, it comprises additional connection means between said structural supporting casing and the gas generator, arranged between the upstream and downstream ends of the casing.

The invention is thus characterised in that it enables at least part of the stress, resulting from the overhanging position of the receiver, to no longer transit through the portion of the gas generator situated downstream from the intermediate housing. Indeed, this stress transits via the structural casing to be subsequently introduced directly into the intermediate housing separating the two compressors. The solution provided thus advantageously makes it possible to remove the direct mechanical connection between the downstream end of the gas generator, and the upstream end of the receiver. Preferably, in addition, no direct mechanical connection is envisaged between the receiver and the outer housing of the gas generation situated downstream from the intermediate housing.

This gives rise to a reduction in the distortions of the gas generator, particularly of the outer housing thereof, downstream from the intermediate housing. This induces a noteworthy limitation of the play-related consumption at the end of the blades of the generator modules, particularly at the end of the blades of the high-pressure compressor. The overall efficiency and the surge margin of the turbine engine are thus substantially enhanced.

Also according to the invention, said additional connection means are designed to enable relative movement between said structural support casing and the gas generator. This makes it possible not only to handle the differential heat expansion between the two elements connected by these additional means in a satisfactory manner, but also to increase the portion of the stress resulting from the overhanging position transiting to the intermediate housing substantially, without loading the outer housing of the gas generator. It is even possible to ensure that the all the stress in question transits via this casing, without loading the part of the gas generator situated downstream from the intermediate housing. The overall efficiency of the turbine engine is thus perfectly optimised by means of the flexibility provided by the additional connection means, thus enabling the casing to be deformed while limiting/preventing the transmission of stress to the gas generator.

Preferably, said additional connection means comprise a plurality of connecting rods distributed circumferentially with respect to each other, about the longitudinal axis of the turbine engine, these connecting rods being preferentially mounted at the ends thereof with ball joints.

Preferably, said additional connection means are arranged downstream from the combustion chamber of the gas generator, and more preferentially, in the vicinity of a downstream end of the gas generator.

Finally, the turbine engine preferably comprises means for extracting an air flow at the low-pressure compressor outlet and routing same to an annular space defined externally by the structural support casing, the turbine engine being designed such that said air flow is introduced into a power turbine of the receiver. The structural casing is then moved to channel a secondary air flow through the turbine engine, which is usually devoid thereof in this type of non-streamlined contrarotating propeller design. The extracted air flow is then reinjected into the power turbine, making it possible to reduce the fuel consumption, cool the gas generator elements situated in contact with and in the vicinity of the diverted air flow and control the thermodynamic aspects of the low-pressure compressor, particularly the surge margin thereof.

The air may be extracted using fixed or controllable flaps, preferably mounted on the intermediate housing.

Further advantages and features of the invention will emerge in the non-limiting description detailed hereinafter.

BRIEF DESCRIPTION OF THE DRAWINGS

This description will be carried out with respect to the appended figures wherein.

DETAILED DESCRIPTION OF PREFERRED EMBODIMENTS

Figure 1:
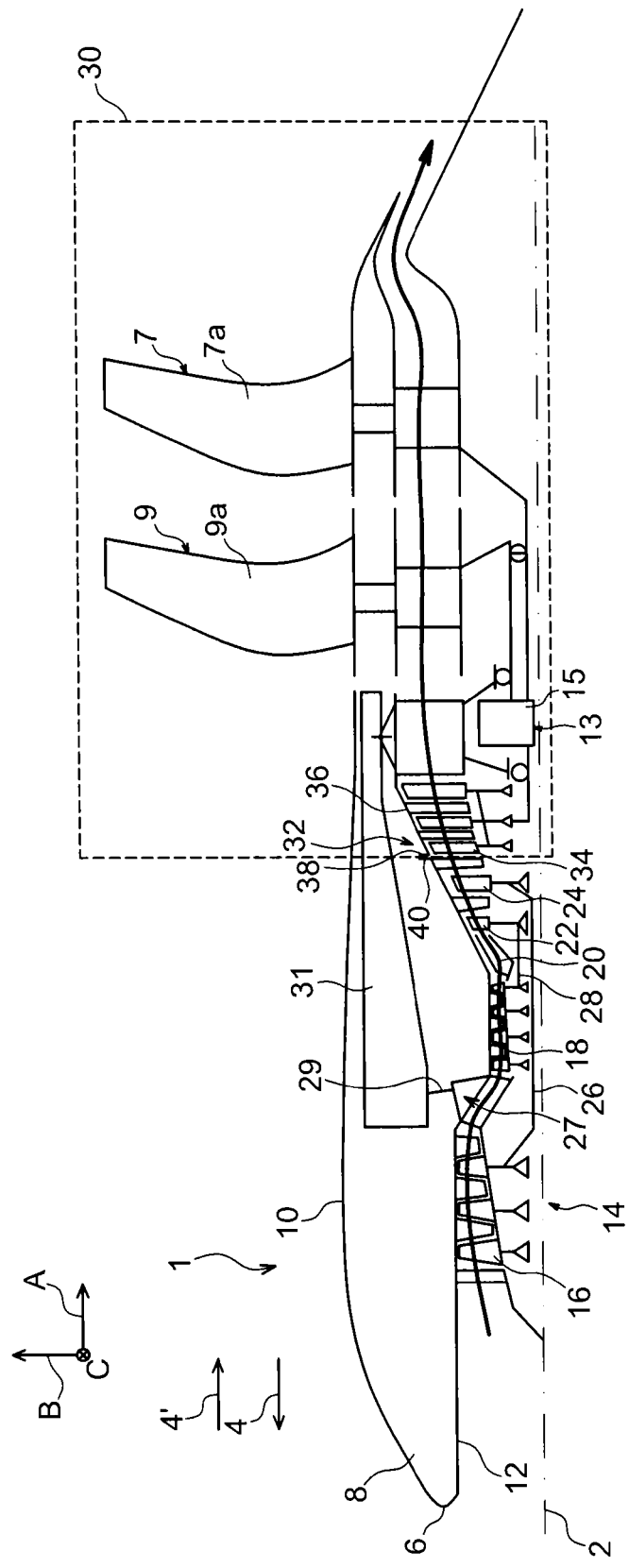
FIG. 1, described above, represents a schematic longitudinal half-section view of a turbine engine, according to a known embodiment of the prior art.
Figure 2:
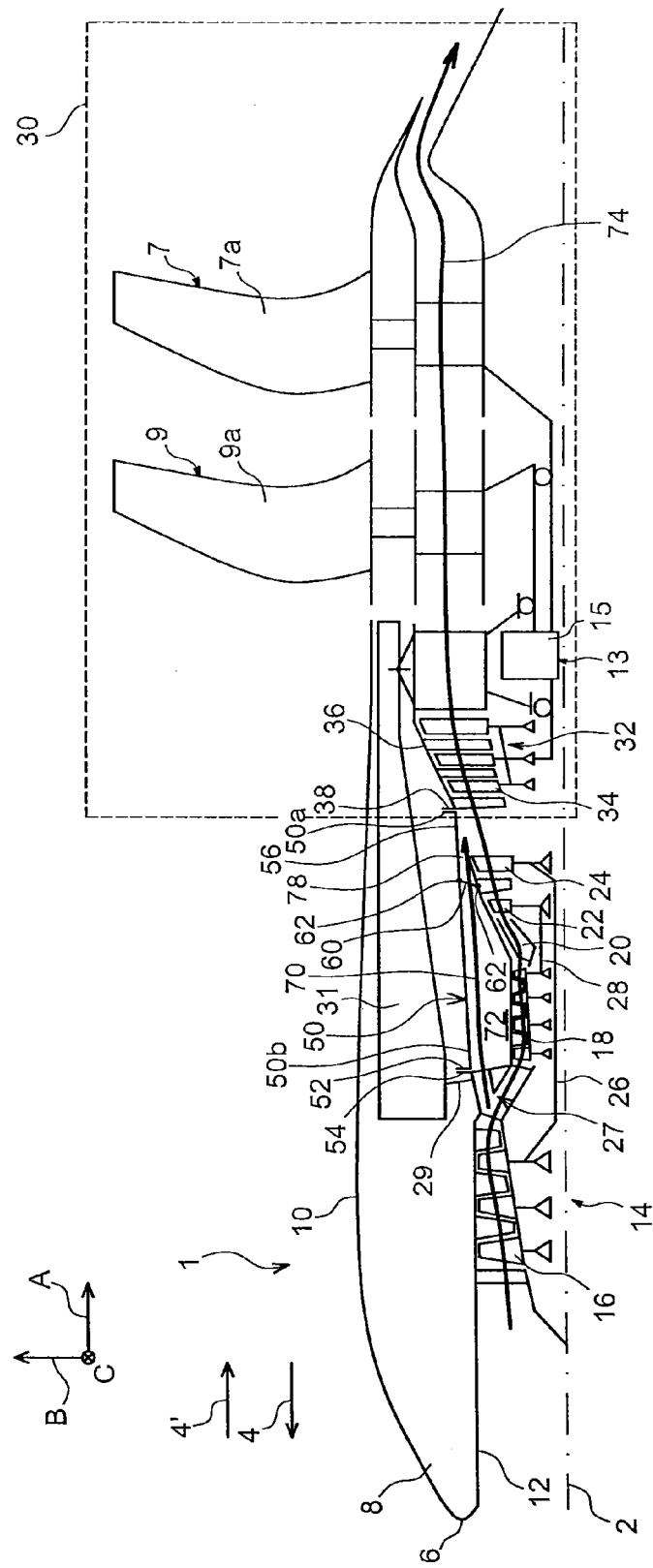
FIG. 2 represents a longitudinal half-section view of a turbine engine according to a preferred embodiment of the present invention.

FIG. 2 represents an open rotor type turbine engine, according to a preferred embodiment of the present invention. The elements bearing the same reference numbers as the elements of the turbine engine in FIG. 1 consist of identical or similar elements.

In this way, it can be noted that the specificity of the present invention lies in the presence of a structural casing 50 for supporting the receiver 30.

This casing 50 extends around the gas generator 14, centred on the axis 2, between a downstream end 50a and an upstream end 50b. The upstream end 50b is attached to the intermediate housing via an attachment flange 52 provided on the casing, and an attachment flange 54 of the intermediate housing 27. The two flanges are attached conventionally by bolting. The flange 54 extends radially outwards from an outer downstream end of the intermediate housing, this flange 54 has a contact surface with the flange 52, situated in a plane corresponding to the interface plane between the intermediate housing 27 and the portion of the outer housing 12 surrounding the high-pressure compressor 18. In this way, the casing 50 extends from the intermediate housing 27 around and away from the outer housing 12, downstream towards the end 50a thereof bearing an attachment flange 56. The flange is attached conventionally by bolting to the upstream attachment flange 38 of the receiver 30, the latter flange 38 thus no longer being attached directly on the downstream part of the gas generator 14, as in the case in the prior art.

On the other hand, additional connection means between the casing 50 and the downstream end of the gas generator 14 are provided, these means being preferentially mounted close to the downstream end 50a, and connected to the part of the outer housing 12 surrounding the turbine 24, on or in the vicinity of a downstream end thereof.

These means are in the form of a plurality of connecting rods 60 distributed circumferentially with respect to each other, about the longitudinal axis 2. Each connecting rod 60 is preferably inscribed in a plane incorporating this axis 2, slightly inclined with respect to the vertical direction such that the radially inward end thereof is offset downstream with respect to the radially outward end thereof. This arrangement makes it possible to accompany the heat expansion of the gas generator downstream in a satisfactory manner, with said generator tending to undergo more expansion than the casing 50, which is less exposed to temperature stress.

In this way, the connecting rods advantageously enable a relative movement between the structural casing 50 and the gas generator 14, in the three directions, longitudinal A, radial B and tangential C. To facilitate these relative movements, the connecting rods 60 are mounted at the ends thereof with ball joints 62.

With this design, the stress resulting from the overhanging position of the reciever 30 transit almost exclusively via the casing 50, which may then be deformed without loading the gas generator arranged at a distance, radially inward.

The casing 50 is preferentially produced using two half-shells attached longitudinally onto each other. They are made of metal or a composite material, according to the level of temperature stress to which they are subjected.

This casing 50 may advantageously be used so as to circulate a cool secondary flow inside the turbine engine. To this end, it comprises means for extracting an airflow (not shown), wherein the means for extracting the airflow are flaps for extracting an air flow 70 at the outlet of the low-pressure compressor 16. The flaps, mounted on the intermediate casing, are fixed or controllable. The air flow 70 diverted from flow from the compressor 16 thus transits via the intermediate housing 27 wherein the flow 70 is extracted, to reach an annular space 72 defined externally by the inner surface of the casing 50, and defined internally by the outer housing 12 of the generator. The flow 70 is routed downstream until it reaches an annular passage 78 between the downstream ends of the housing 12 and the casing 50, and is thus introduced into the free power turbine 36, as represented in FIG. 2 In this turbine, it joins the primary flow 74 from the turbine 24, from which it was separated by the flaps in the intermediate housing 27.

Figure 3:
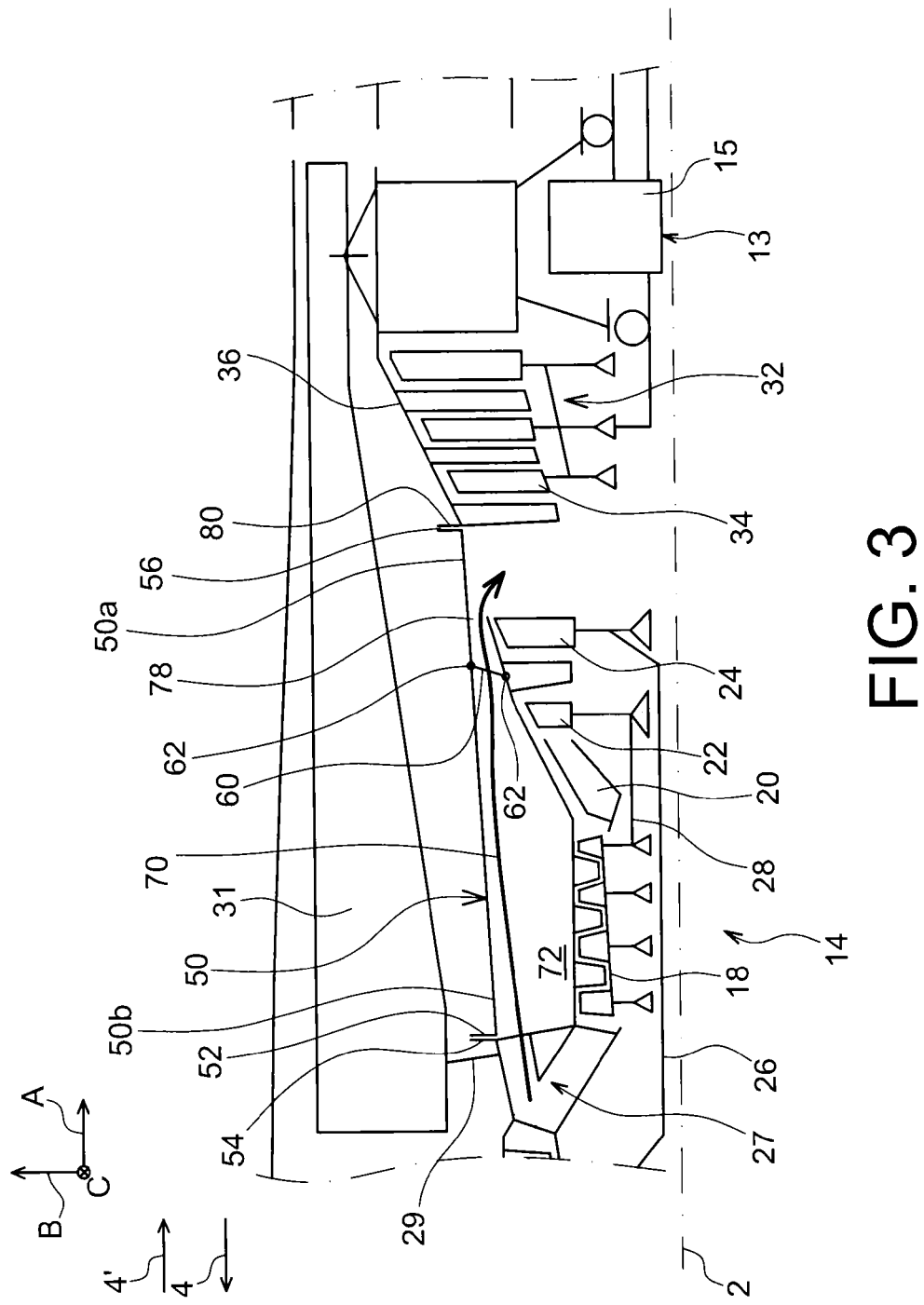
FIG. 3 represents a similar view to that in FIG. 2, with the turbine engine, partially shown, in the form of an alternative embodiment.

According to an alternative embodiment shown in FIG. 3, the downstream end 50a of the casing 50 is connected by the flange 56 thereof to the downstream end of the outer housing 36 of the turbine 32, via a flange 80 intended for this purpose.

Obviously, various modifications may be made to the invention described above, merely as non-limiting examples, by those skilled in the art.

The invention claimed is:

1. An aircraft turbine engine comprising:
   contrarotating propeller receiver and a dual-body gas generator comprising a low-pressure compressor and a high-pressure compressor separated by an intermediate housing, said dual-body gas generator being arranged upstream from said contrarotating propeller receiver;
   a structural casing for supporting the contrarotating propeller receiver, said structural casing surrounding the dual-body gas generator and having a downstream end attached to an upstream flange of a stator outer housing of said contrarotating propeller receiver and an upstream end attached to said intermediate housing, said structural casing extending between said intermediate housing and said contrarotating propeller receiver;
   an annular space is defined externally by an inner surface of said structural casing and defined internally by an outer casing of said dual-body gas generator; and
   connection means connecting said structural casing to a downstream end of said outer casing of the dual-body gas generator, said connecting means being arranged between the upstream and downstream ends of the structural casing,
   wherein said connection means are designed to enable relative movement between said structural casing and the dual-body gas generator,
   wherein the contrarotating propeller receiver includes a free power turbine at an upstream end thereof, and
   wherein said connection means comprise a plurality of connecting rods distributed circumferentially with respect to each other, about a longitudinal axis of the aircraft turbine engine.

2. The aircraft turbine engine according to claim 1, wherein ends of each of said plurality of connecting rods are mounted with ball joints.

3. The aircraft turbine engine according to claim 1, wherein said connection means are arranged downstream from a combustion chamber of the dual-body gas generator.

4. The aircraft turbine engine according to claim 1, further comprising means for extracting an air flow at an outlet of the low-pressure compressor and routing said air flow to the annular space defined externally by the structural casing, the aircraft turbine engine being designed such that said air flow is introduced into the free power turbine of the contrarotating propeller receiver.

5. The aircraft turbine engine according to claim 1, wherein each of the plurality of connecting rods includes a radially inner end and a radially outer end, the radially inner end being offset upstream of the radially outer end.

\* \* \* \* \*

UNITED STATES PATENT AND TRADEMARK OFFICE
CERTIFICATE OF CORRECTION

PATENT NO. : 9,217,391 B2
APPLICATION NO. : 13/654796
DATED : December 22, 2015
INVENTOR(S) : Francois Gallet et al.

Page 1 of 1

It is certified that error appears in the above-identified patent and that said Letters Patent is hereby corrected as shown below:

In the specification

Col. 4, line 67, change "power turbine 36" to --power turbine 32--.

Signed and Sealed this
Fifth Day of July, 2016

Michelle K. Lee
*Director of the United States Patent and Trademark Office*